March 16, 1948.  G. K. JOHNSTONE  2,437,854
SLIDE VALVE ASSEMBLY FOR THE FLUID PRESSURE
POWER CYLINDERS OF DUPLEX RECIPROCATORS
Filed June 5, 1945  2 Sheets-Sheet 2
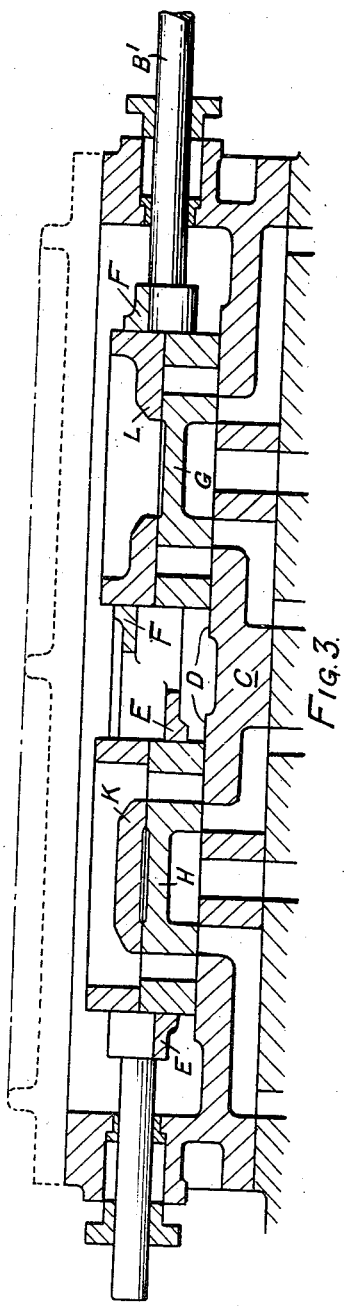
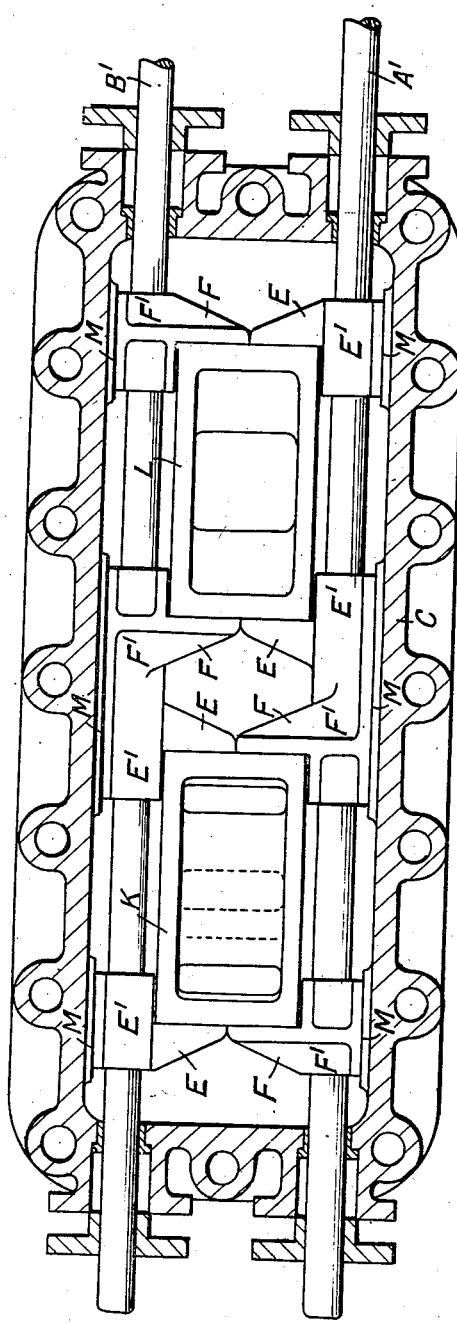

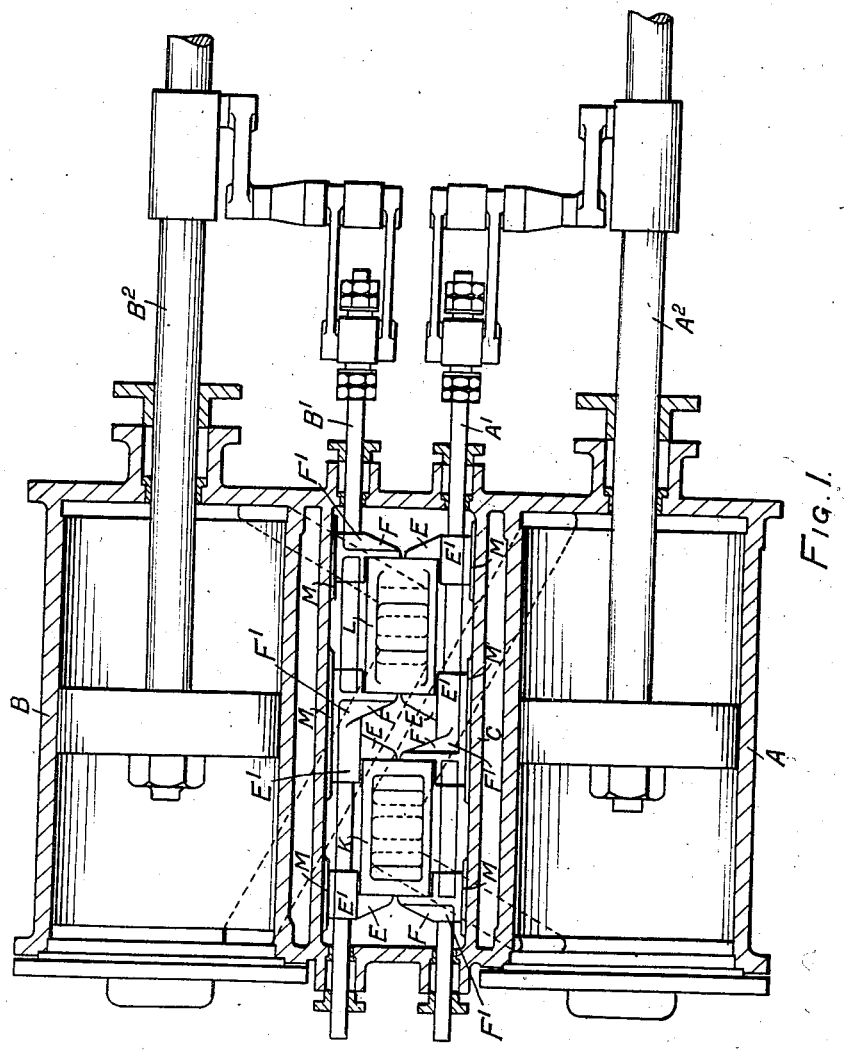

Patented Mar. 16, 1948

2,437,854

UNITED STATES PATENT OFFICE 2,437,854

SLIDE VALVE ASSEMBLY FOR THE FLUID PRESSURE POWER CYLINDERS OF DUPLEX RECIPROCATORS

George Kirkpatrick Johnstone, Glasgow, Scotland, assignor to J. H. Carruthers & Company Limited, Glasgow, Scotland, a corporation of Great Britain Application June 5, 1945, Serial No. 597,706
In Great Britain November 17, 1943

2 Claims. (Cl. 121—114)

This invention relates to a slide valve assembly for the fluid pressure power cylinders of a duplex reciprocator, such as, for example, a duplex pump, and may be regarded as a further development of the construction described in the prior British Patent specification No. 177,115.

In the said prior specification there is described a slide valve assembly including two main valves, and two cut-off valves operating on the backs of the main valves, each main valve being operated from the piston of the cylinder other than that which it serves, and each cut-off valve being operated from the piston of the cylinder which it serves.

A slide valve assembly according to the invention includes two main slide valves and two cut-off valves operating on the backs of the main valves within a valve chest, two valve-actuating reciprocatory spindles, lugs attached to said spindles, the lugs on each spindle engaging one main slide valve and one cut-off valve so as to impart reciprocating movements to said valves, and guide-forming members carried by said spindles and engaging guide surfaces within the valve chest.

A slide valve assembly according to the invention is illustrated in the accompanying drawings in which Fig. 1 is a part plan part sectional view, and Figs. 2 and 3 are a plan and a longitudinal section, respectively, drawn to a larger scale than Fig. 1.

Referring to the drawings, the slide valve assembly shown includes two main valves G and H, and two cut-off valves L and K operating on the backs of the main valves.

Each main valve is operated from the piston of the cylinder other than that which it serves, and each cut-off valve is operated from the piston of the cylinder which it serves.

The main and cut-off valves are constituted by simple slab-like ported members disposed between two valve-operating spindles A' and B' within a valve chest C presenting a ported face D from which passages connect with the ends of the two cylinders A and B, respectively.

Secured on each of the spindles A' and B' are two pairs of inwardly projecting lugs spaced apart axially on the respective spindle. One pair of lugs E engages the ends of one main valve, and the other pair of lugs F engages the ends of the cut-off valve associated with the other main valve. Thus, as in the prior construction, each valve spindle A' or B', actuated from one of the piston rods A² or B² of the pump, effects joint reciprocation of one main valve and one cut-off valve.

The lugs are unitary with bracket bosses E' and F' penetrated by and secured on the respective spindles and affording reciprocating guides engaging plane guide faces M on the lateral walls of the valve chest C. The bracket bosses E' and F' serve also to locate the valves laterally and thus to confine the valves in their proper positions on the ported face D of the chest C.

The two lugs on each spindle which engage the inner ends of the valves actuated by such spindle are formed unitary with a common long bracket boss E' F' secured on the respective spindle.

As will be understood, the construction provides a simple slide valve assembly wherein the valves are not provided with lateral extensions which partially embrace the spindles, and wherein the valves and the spindles are efficiently guided.

I claim:

1. A slide valve assembly for the fluid pressure power cylinders of a duplex reciprocator, including a valve chest, two main slide valves and two cut-off valves operating on the backs of said main valves within said valve chest, two valve-actuating reciprocatory spindles, lugs attached to said spindles, the lugs on each spindle engaging one main slide valve and one cut-off valve so as to impart reciprocating movements to said valves, and guide-forming members carried by said spindles and engaging guide surfaces within said valve chest.

2. A slide valve assembly for the fluid pressure power cylinders of a duplex reciprocator, including a valve chest, two main slide valves, a cut-off valve for each main slide valve operating on the back of the main slide valve, two valve-actuating reciprocatory spindles, bracket bosses carried by each of said spindles, each bracket boss having a guide surface engaging a guide surface within the valve chest and valve actuating lugs, the lugs of each bracket boss engaging and operating one main slide valve and the cut-off valve for the other main slide valve.

GEORGE KIRKPATRICK JOHNSTONE.

REFERENCES CITED

The following references are of record in the file of this patent:

UNITED STATES PATENTS

| Number | Name | Date |
|---|---|---|
| 455,555 | Worthington | July 7, 1891 |
| 1,453,029 | Twells | Apr. 24, 1923 |

FOREIGN PATENTS

| Number | Country | Date |
|---|---|---|
| 177,115 | Great Britain | Mar. 23, 1922 |